US006704812B2

(12) United States Patent
Bakke et al.

(10) Patent No.: US 6,704,812 B2
(45) Date of Patent: Mar. 9, 2004

(54) TRANSPARENT AND DYNAMIC MANAGEMENT OF REDUNDANT PHYSICAL PATHS TO PERIPHERAL DEVICES

(75) Inventors: Brian Eric Bakke, Rochester, MN (US); Scott Alan Bauman, Rochester, MN (US); Frederic Lawrence Huss, Rochester, MN (US); Andrew J Kulich, Rochester, MN (US); Laurel Scaife, Rochester, MN (US); Timothy Jerry Schimke, Oronoco, MN (US)

(73) Assignee: International Business Machines Corporation, Armonk, NY (US)

( * ) Notice: Subject to any disclaimer, the term of this patent is extended or adjusted under 35 U.S.C. 154(b) by 471 days.

(21) Appl. No.: 09/727,056

(22) Filed: Nov. 30, 2000

(65) Prior Publication Data

US 2002/0065962 A1 May 30, 2002

(51) Int. Cl.[7] .................................................. G06F 3/00
(52) U.S. Cl. ..................... 710/38; 710/11; 710/309; 710/105; 710/315; 714/4; 714/2; 714/7
(58) Field of Search .......................... 710/36–51; 714/2, 714/4, 7

(56) References Cited

U.S. PATENT DOCUMENTS

| | | | | |
|---|---|---|---|---|
| 5,845,091 A | * | 12/1998 | Dunne et al. ............... 709/240 |
| 5,878,237 A | * | 3/1999 | Olarig ........................ 710/309 |
| 5,922,077 A | * | 7/1999 | Espy et al. .................... 714/7 |
| 6,032,194 A | * | 2/2000 | Gai et al. .................... 709/239 |
| 6,434,637 B1 | * | 8/2002 | D'Errico ...................... 710/38 |
| 6,526,521 B1 | * | 2/2003 | Lim ............................. 714/4 |
| 6,560,683 B1 | * | 5/2003 | Linnell et al. .............. 711/154 |

* cited by examiner

*Primary Examiner*—Jeffrey Gaffin
*Assistant Examiner*—Mike Nguyen
(74) *Attorney, Agent, or Firm*—Karuna Ojanen

(57) ABSTRACT

A redundancy manager preferably in an I/O adapter has been disclosed to manage commands to peripheral devices in a computer system. These peripheral devices have multiple ports and may have a different bus associated with each port. The buses, referred to as independent pathways, moreover, need not have the same protocol. The redundancy manager determines the number of independent pathways connected to the peripheral device, presents only one logical device to the operating system and any device driver and any other command or device processing logic in the command path before the redundancy manager. For each incoming command, the redundancy manager determines which pathways are properly functioning and selects the best pathway for the command based on load balancing considerations and any ordering semantics that must be preserved in the incoming command and any outstanding commands and associated data that have not yet executed. The redundancy manager further reroutes the command to an alternate path and resets the device for the alternate path if the selected path failed. Thus, a dynamic mechanism and method to manage multiple pathways to I/O devices such as storage disks do not require the intervention of either the operating system of the computer or any device driver associated with the device or the interconnecting bus.

35 Claims, 5 Drawing Sheets

TRANSPARENT AND DYNAMIC MANAGEMENT OF REDUNDANT PHYSICAL PATHS TO PERIPHERAL DEVICES

FIELD OF THE INVENTION

This invention relates generally to field of computer processing and more specifically relates to managing multiple physical paths from a host computer system to peripheral devices.

BACKGROUND OF THE INVENTION

Advances in computer processor architecture have resulted in increased processing speeds up to and beyond one gigahertz. One aspect of computer development then has been directed to having tasks immediately available for these fast busy processors. Management of internal resources to keep the processor busy may include both hardware and software multithreading registers, cache management, pipeline allocation, branch prediction, etc. The external resources may refer to external disk drives, external memory storage, printing, network communication, etc. Typically, management of data for processing along these multiple external pathways, which are usually multiple buses of various protocols to and from these attached peripheral devices, has been relegated to the host operating system and/or the host device driver software applications. Typically during processing to these peripheral devices, the host operating system executes a device driver application or function so that it can communicate with an adapter connected to the peripheral device. The system's operating system executes, for example, an application program until an interrupt or some instruction in the program indicates that a peripheral device needs data, has the required data, or otherwise requires attention. A conventional context switch procedure changes the context of the host processing system between the device driver and the application program that had been executing.

Given the increasing complexity and pervasiveness of today's computer systems and the increased reliance by the users upon these systems, the management of the physical pathways to/from a host computer system has been a neglected aspect of information handling systems. There are, moreover, multiple buses of many different protocols; just to name a few of the protocols: PCI and PCI-X, Token Ring, Gigabyte Ethernet, Ethernet, Fibre Channel, SSA, Fiber Channel Arbitrated Loop (FCAL), Ultra3 SCSI, Infiniband, FDDI, ATM, 1394, ESCON, wireless relays, Twinax, LAN connections, WAN connections, high performance graphics, etc. It is a management nightmare for the operating system to track and maintain the state of all these buses and their various protocols and schemes for ordering or prioritizing commands. A processor's efficiency is severely compromised if it has to manage data transfer on all these various buses at the same time. Bus protocols, moreover, are constantly evolving and moving towards industry standardization but until then connecting to a new device may involve connecting to a new bus with its own proprietary protocol.

Increasingly so in computer systems, there may be more than one physical pathway from an adapter to its peripheral or external device. One method to manage external bus traffic that is becoming increasingly congested is to use devices with multiple ports, each port having its own I/O adapter that may or may not have a shared or unique cache and with each port having a distinct independent physical pathway to the same external device. Usually, the allocation of one pathway as the primary pathway and another or others as backup pathway(s) is statically assigned in microcode at initialization by the host operating system or the device driver. The host operating system may be aware of the multiple pathways, or may just consider each physical path as a different device. In the latter scenario, even though one device X is connected to the host computer system through a dual-ported adapter and there are two independent physical paths to device X, the host operating system sees two devices with the same name X. In any event, to change or reroute data from the primary to the backup path, the host computer's operating system becomes involved.

The host operating system may have difficulty maintaining cache coherency of adapter caches if there is a separate cache in the adapter for each pathway to the same device. For example, imagine that the host wants to access an external memory device having independent physical paths each with its own adapter. The cache associated with one physical path may have an outstanding WRITE command that hasn't been executed but before it can write the fresh data to the memory location in the peripheral device, a READ command that actually issued after the WRITE command accesses that memory location on the other path and obtains undetected stale data. Because the problem is undetected, no error is generated. Thus, there is a need to maintain cache coherency within an adapter and manage the appropriate sequencing of commands on the same or different physical paths to a device having multiple pathways.

At the present time, there is no mechanism for dynamic usage and load balancing amongst the redundant physical paths. Once a physical path has failed, moreover, the host operating system has no simple means to dynamically use alternate paths or to recover use of the failed path once it becomes available. It is further desirable to adapt to new devices and new physical paths without involving complications to the operating system of the host computer, i.e., it is important to be able to attach new and different devices to a host computer system independently of the operating system. Investments in new and/or unique hardware and/or packaging every time a new peripheral device is installed is unacceptable in today's paradigm of modular computing.

It is thus an object of the invention to provide for efficient computing resources by the management of multiple independent pathways to a computer system's peripheral devices.

Other objects, features, and characteristics of the invention; methods, operation, and functions of the related elements of the structure; combination of parts; and economies of manufacture will become apparent from the following detailed description of the preferred embodiments and accompanying Drawing, all of which form a part of this specification, wherein like reference numerals designate corresponding parts in the various figures.

SUMMARY OF THE INVENTION

To satisfy this objective and others in a computer system, a method of managing command and data flow to peripheral devices is disclosed, the method comprising the steps of determining the number of independent physical paths to at least one peripheral device connected to the computer system, resolving all the different independent physical paths to the peripheral device into one logical path, presenting the one logical path to any components of the computer system that originates or preprocesses a command destined for the peripheral device, receiving the command, and for each received command, selecting one independent physical path on which to route the received command to the peripheral device.

The step of determining the number of independent physical paths to the peripheral device connected to the computer system may further comprise reading all the identification codes uniquely associated with the peripheral device on all the independent physical paths. The unique identification code associated with the peripheral device may be a world wide identification code and/or vital product data.

The step of resolving all the independent physical paths to the peripheral device into one logical path may further comprise determining if there is a duplicative identification code on the independent physical paths thereby indicating that the peripheral device has a plurality of independent physical paths connected to it, and if so, correlating those independent physical paths.

The method of method of managing command and data flow to peripheral devices may further comprise preserving protocol requirements of the selected physical path.

The step of selecting one of the independent physical paths on which to route the command to the peripheral device may further comprise determining the number of functional physical paths to the at least one peripheral device. The selection method may further comprise determining the number of outstanding commands to the peripheral device, and determining if any outstanding command and/or the received command have any required execution attributes. If so, the method may comprise honoring any required execution attributes of the received command and/or of any outstanding commands destined for the peripheral device. If there are any required execution attributes to be honored, then the method may further comprise determining if any outstanding command have any required execution attributes, determining if the received command has any required execution attribute, determining if there are any outstanding commands to the at least one peripheral device on more than one independent physical path, and if so, waiting until only one independent physical path has any outstanding commands for the peripheral device and selecting the physical path with the outstanding commands for the received command.

The method of claim 6 of selecting the independent physical path may further comprise reallocating a received command load to the peripheral device on the independent paths. In conjunction with the reallocation, the step of balancing a command load to the peripheral device on the independent paths may further comprise summing the product of a plurality of load balancing factors and the weight given each factor for each independent physical path and then selecting the independent physical path having the lowest sum. One load balancing factor may be the number of outstanding commands to the at least one peripheral device. Another load balancing factor may be the number of outstanding commands on a physical path to all devices. Still another load balancing factor may be the amount of data associated with an outstanding command on a physical path to the peripheral device. And yet another load balancing factor may comprise the expected latency of outstanding commands on a physical path to the peripheral device. Another load balancing factor may be the expected latency of outstanding commands on a physical path to all devices. Of course, another load balancing factor may comprise the latency of a physical path to the peripheral device.

The step of determining the number of a plurality of independent physical paths to the at least one peripheral device further may comprise detecting that at least one of the plurality of independent physical paths to the at least one peripheral device has failed, rerouting the received command to a functional physical path, and ensuring the at least one peripheral device is in a state ready to accept the rerouted command. The failed physical path may be repaired concurrently with rerouting the received command. After the failed path has been repaired, the failed path may be used.

As another embodiment, the invention may be considered a computer system for transferring commands to a peripheral device, comprising a central processing unit to execute an operating system and at least one device driver application program applicable to at least one peripheral device; a main memory connected to the central processing unit with a memory bus; at least one peripheral device attached to the central processing unit and the main memory; a plurality of independent physical paths connecting the central processing unit and main memory with the at least one peripheral device; and a redundancy manager connected between the at least one peripheral device and the host system bus to dynamically manage each command to the at least one peripheral device without intervention of the operating system and/or the at least one device driver application program. The independent pathways need not have the same protocols. The redundancy manager may comprise an input/output adapter.

In any event, the redundancy manager manages commands on the plurality of independent physical paths independent of command processing and independent of the protocols of the independent physical paths. The redundancy manager may further comprise a path determiner which dynamically chooses for each command the independent path for the command to the peripheral device. The redundancy manager may also further comprise a path resolver that resolves all the independent physical paths to the peripheral device into one logical path presented to the operating system, the device driver application program, the command processing. Still, the redundancy manager may further comprise a load balancer that balances the command load across the independent physical paths. Another feature which may comprise part of the redundancy manager is an ordering maintainer which preserves ordering semantics of the protocols of the independent physical paths. The redundancy manager may also have a rerouter to reroutes commands/data from a failed independent physical path to a functional independent physical path connected to the peripheral device. A path repair detector that detects when the failed independent physical is once again functional within the redundancy manager allows it to manage commands on the recovered path.

The invention may also be considered an I/O adapter connected between a central processing unit having an operating system and a plurality of device driver applications and a plurality of external peripheral devices of which at least one of the external peripheral devices has a multi-ported connection to independent physical paths connected to the I/O adapter. The I/O adapter having a redundancy manager comprising means to detect the number of independent physical paths to the at least one external peripheral device; means to resolve more than one independent physical path to the same external peripheral device into one logical pathway; means to present the one logical pathway to the central processing unit and to any command/data processing prior to the redundancy manager; means to receive a command/data intended for the peripheral device; means to dynamically determine the optimum independent physical path for the received command/data to the peripheral device; means to preserve the protocols and ordering semantics of the independent physical paths to the peripheral device; means to detect if an independent physical path has failed; means to reroute a command from the failed independent physical path; means to detect that the failed independent physical path has recovered; and means to automatically use the recovered independent physical path.

The method is also a program product for use in a computer network for managing multiple independent physical pathways connected to a peripheral device, comprising a signal-bearing medium carrying thereon a redundancy manager comprising: a detector of all multiple independent paths connected to the peripheral device; a resolver to project to the computer network one logical pathway to the peripheral device; a path calculator which determines an optimum pathway of the multiple independent physical paths for transit of incoming commands/data to the peripheral device; a deferral agent to defer ordering semantics of the incoming and any outstanding commands/data intended for the peripheral device to a protocol of the multiple independent paths; and a selector operable for each incoming command/data to determine an appropriate path considering the results of the path calculator and the deferral agent. The detector may notify the selector that one or more of the multiple independent paths have failed so that the selector reroutes the incoming command/data to another of the multiple independent paths. The program product may further comprise a state resetter to reset all the multiple independent paths other than the failed path(s) into a state to accept the incoming command/data. A recovery notifier to begin using the failed one of the multiple independent paths when the failure has been corrected may also be within the program product.

The invention has thus been summarized but is best understood with reference to the Drawing and the detailed description of the preferred embodiments of the invention in which:

DETAILED DESCRIPTION OF THE INVENTION

Figure 1:
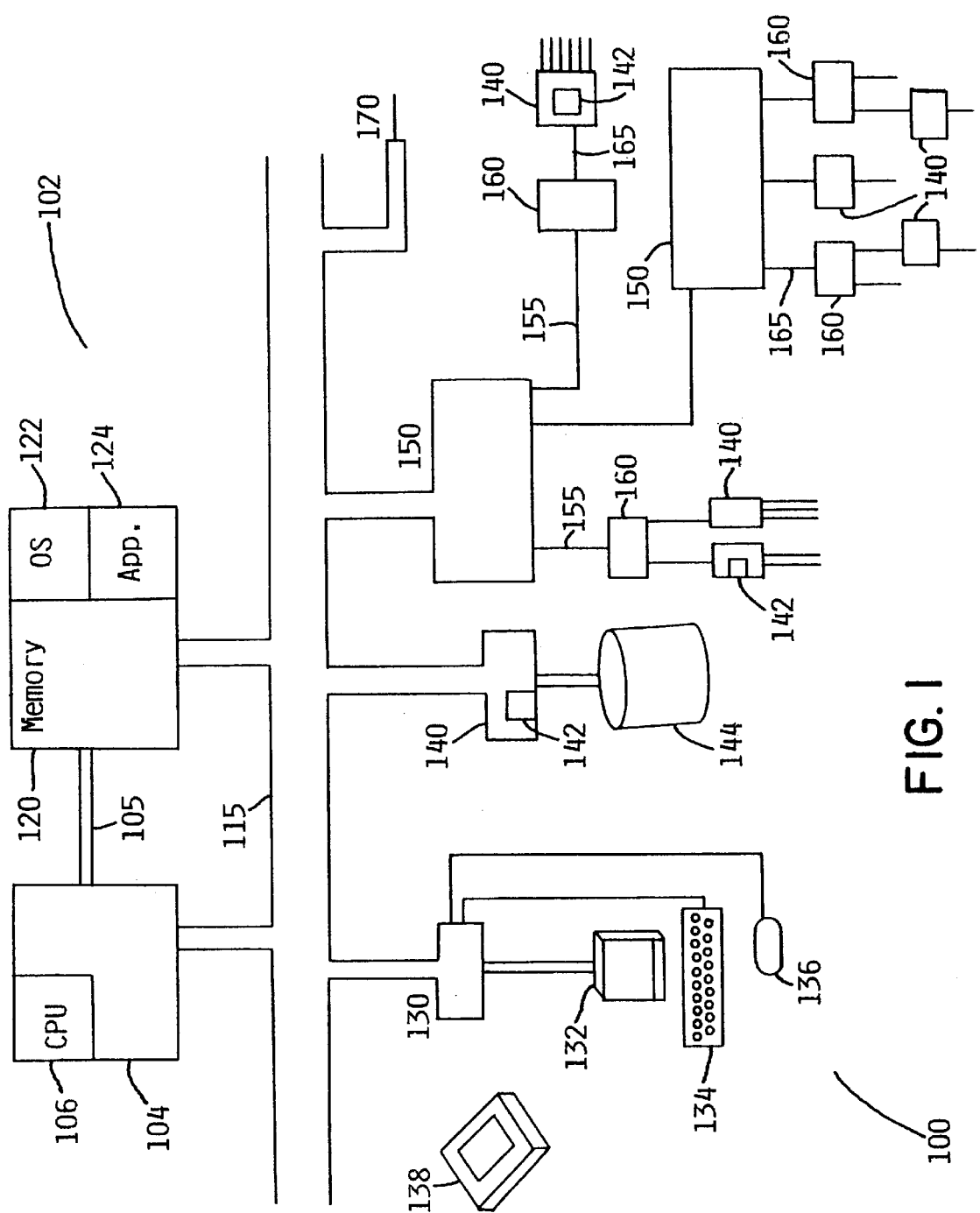
FIG. 1 is a high-level block diagram of a computer system capable of implementing the preferred embodiment of the invention.

FIG. 1 illustrates the components and an interconnection topology for an information handling system, typically a computer system 100, utilizing the present invention. Computer system 100 may comprise a host 102 having a host processor complex 104 connected to a main memory 120 by an internal bus 105 and/or a host system bus 115. The host processor complex 104 has at least one general-purpose programmable processor unit (CPU) 106, executing program instructions stored in main memory 120. Although a single CPU 106 is shown in FIG. 1, it should be understood that many processor complexes 104 have multiple CPUs 106.

Main memory 120 may be physically included within the host processor complex 104 or connected to it via an internal bus system 105 or via a host system bus 115. Memory 120 is a random access semiconductor memory for storing data and programs; memory 120 is shown conceptually as a single monolithic entity but in many computer systems 100 memory is arranged as a hierarchy of caches and other memory devices. In some instances, a hierarchy of cache memories is associated with each CPU 106. Memory 120 includes operating system (OS) 122 and applications 124. Operating system 122 provides, inter alia, functions such as device drivers or interfaces, management of memory pages, management of multiple tasks, etc. as is known in the art. Applications 124 may include a server software application in which case network interface 170 may interact with a server software application 124 to enable computer system 100 to be a network server.

Host system bus 115 supports the transfer of data, commands, and other information between the host processor system 102 and any peripheral or external device attached to it, and any communication of data which may occur between the external devices independent of the host processor complex 102. While shown in simplified form as a single bus, the host system bus 115 is typically structured as multiple buses which may be hierarchically arranged. Host system bus 115 is illustrated as being connected to a myriad of external or peripheral devices either through a connection hub 130, or through an adapter 140, or a multifunction adapter 150, or directly to a network 170. These peripheral devices may include a monitor or display 132, a keyboard 134, a mouse or other handheld device 136, and a printer 138. Display 132 may be a cathode-ray tube display, a flat panel display, or a touch panel, and other display technology. One or more adapters 140 may support keyboard 134 and pointing device 136 depicted as a mouse; it being understood that other forms of input devices could be used. The number and types of devices shown in FIG. 1 are illustrative only and ordinary users of computer systems now know that a great variety of connected devices exist, e.g., microphones, speakers, infrared remote controls, wireless, etc. It is anticipated that the computer system 100 not be limited to those devices illustrated in FIG. 1.

The host system bus 115 is also shown connected to an adapter 140 illustrated here as an I/O adapter connected to an external memory device 144. External memory device 144 may be rotating magnetic disk storage, e.g., a RAID-X configuration where X represents a particular embodiment, or rotating or static optical drives, or magnetic tape storage, etc. Apart from and in addition to conventional adapter and related control components such as direct memory access components, within the context of the invention herein adapter 140 includes adapter microcode or firmware and decision logic which may be embodied as a message processor 142. The adapter 140 may also be provided with at least one fast nonvolatile write cache, queues, interrupt registers connected to the message processor 142 and/or decision logic. The message processor 142 processes incoming downstream messages from the host processor complex 102 and generates and transmits response messages to the host processor complex 102. Whether simple having only limited decision logic or complex having a message processor 142, an adapter contains the necessary electronic components and logic to adapt or convert data of one protocol on one bus to another protocol on another bus. Adapters 140 may connect a wide variety of devices to the host computer system and to each other such as, but not limited to, tape drives, optical drives, printers, disk controllers, other bus adapters, PCI adapters, workstations using one or more protocols including, but not limited to, Token Ring, Gigabyte Ethernet, Ethernet, Fibre Channel, SSA, Fiber Channel Arbitrated Loop (FCAL), Ultra3 SCSI, Infiniband, FDDI, ATM, 1394, ESCON, wireless relays, Twinax, LAN connections, WAN connections, high performance graphics, etc.

The host system bus 115 may also be connected to a multifunction adapter 150 to which more I/O devices may be connected either directly, or through one or more bridge devices 160, or through another multifunction adapter 150 on either a primary bus 155 or a secondary bus 165. Various components may be connected to the primary bus 155 including, for example, adapter 140, a bridge device 160, or another multifunction I/O processor or a multifunction adapter 180. The bridge device 160 bridges the primary bus 155 and a secondary bus 165 to which various adapters 140 may be connected. The adapters 140, the primary bus 155, and the secondary bus 165 may conform to the PCI/PCI-X or other industry bus specification. One skilled in the art realizes, however, that the implementation is not limited to a PCI/PCI-X or a SCSI or USB bus implementation but is applicable to any electrical or optical bus where data must be efficiently transferred. A wireless bus implementation may also be included as part of the invention herein.

Network interface 170 provides a physical connection for transmission of data to and from a network. The network may be Internet but could also be any smaller self-contained network such as an intranet, a WAN, a LAN, or other internal or external network using, e.g., telephone transmission lines, cable services, satellites, fiber optics, T1 lines, etc. and any various available technologies. Network interface 170 may comprise a modem connected to a telephone line through which an Internet access provider or on-line service provider is reached, but increasingly other higher bandwidth interfaces are implemented. For example, computer system 100 may be connected to another network server via a local area network using an Ethernet, Token Ring, or other protocol, or a second network server in turn being connected to the Internet. Alternatively, network interface 170 may be provided through cable television, fiber optics, satellites, wireless, or other connections.

Finally, computer system 100 need not be a computer at all, but may be a simpler appliance-like client device with less memory such as a network terminal, a thin client, a terminal-like devices, a voice response unit, etc. The convergence of computing, telecommunications and consumer electronics is causing a tremendous growth in the number and variety of pervasive mobile devices as clients. This mobile architecture enables the multitude of clients including laptops, sub-notebooks, handheld computers such as personal digital assistants and companion devices, and mobile appliances such as smartphones, pages, simple messaging devices and wearable devices. Thus when the computer system 100 is a mobile device, the adapters 140 and network interfaces 170 support a variety of multi-modal interfaces including traditional keyboard and mouse interfaces, small text screens, pen, touch screens, speech recognition, text-to-speech and other emerging technologies like wearable devices. Such special-purpose devices for accessing the world wide web, such as an Internet access box for a television set, or a portable wireless web accessing device, which can implement an adapter for the purpose of communicating data to/from another computer system are also intended to be within the scope of a computer system 100.

The computer system shown in FIG. 1 is intended to be a simplified representation, it being understood that many variations in system configuration are possible in addition to those specifically mentioned here. While computer system 100 could conceivably be a personal computer system, the computer system 100 may also be a larger computer system such as an IBM Enterprise System or an IBM AS/400 system. Computer system 100 and its components are shown and described in FIG. 1 above as a more or less single, self-contained computer system. It is alternatively possible to use multiple computer systems, particularly multiple systems which share a single large database, each having a specialized task. References herein to a computer system 100 should be understood to include either a single computer or a collection of computer systems which provides access to a legacy application and to a network by which to connect to a client system.

As will be described in detail below, aspects of the preferred embodiment pertain to specific method having steps implementable on a computer system 100. In an alternative embodiment, the invention may be implemented as a computer program-product for use with either or both a computer system 100 or an adapter for a peripheral device. The programs defining the functions of the preferred embodiment can be delivered to the computer system 100 and/or to the peripheral device for installation on a connected adapter via a variety of signal-bearing media, which include, but are not limited to: (a) information permanently stored on non-writable storage media, e.g., read only memory devices within either computer such as CD-ROM disks readable by CD-ROM; (b) alterable information stored on writable storage media, e.g., floppy disks within a diskette drive or a hard-disk drive; or (c) information conveyed to a computer by a telephone or a cable media network, including wireless communications. Such signal-bearing media, when carrying instructions that may be read by an adapter or a computer to direct the functions of the present invention, represent alternative embodiments.

Figure 2:
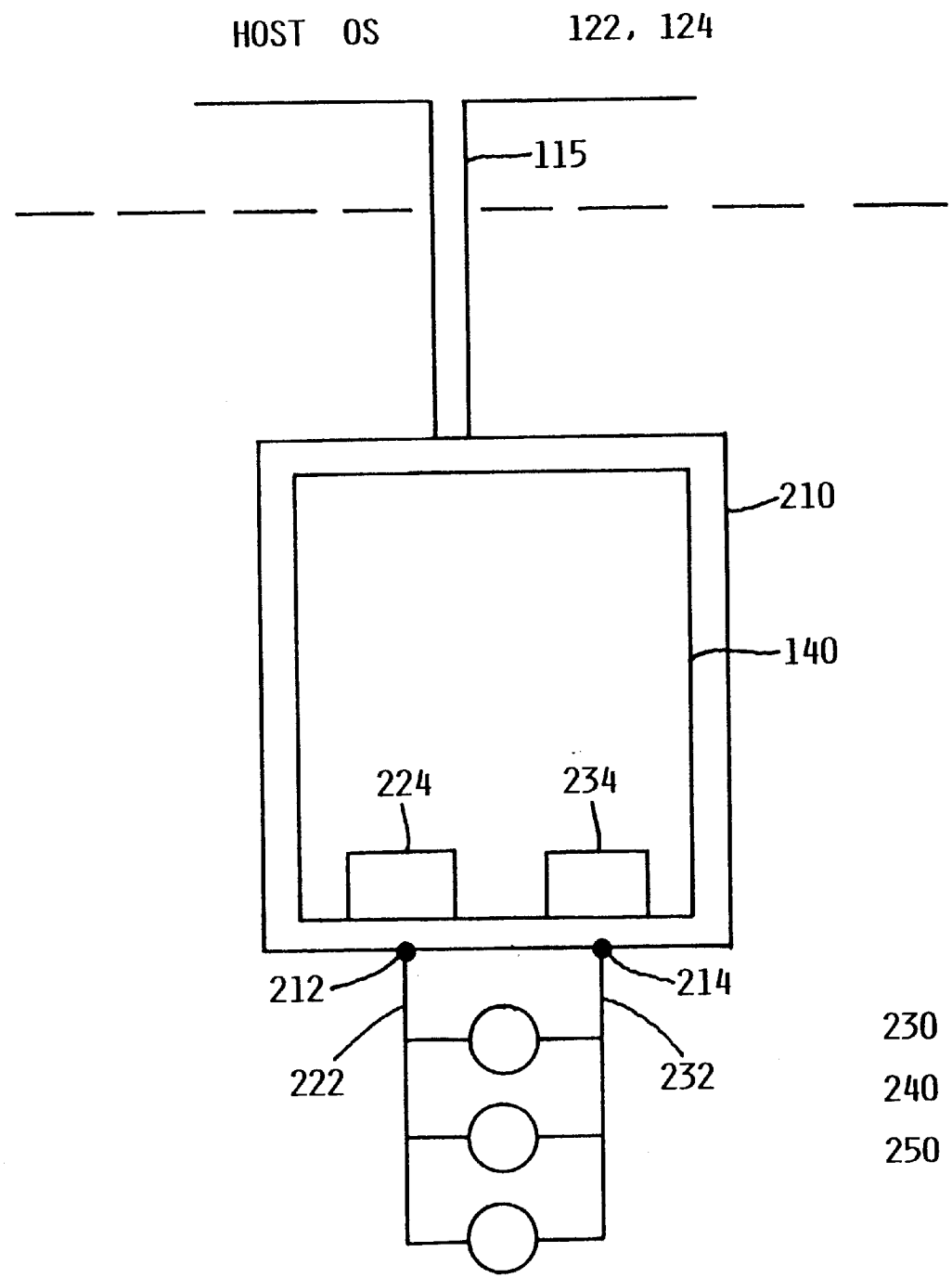
FIG. 2 is a simplified representation of an I/O adapter attached to a host computer system wherein the I/O adapter has two independent ports to the same device.

FIG. 2 is a simplified representation of a dual-ported connector 210 of the computer system 100 of FIG. 1. The connector 210 is connected between the host processor complex 102 and its operating system 122 and applications 124 across the host system bus 115 for the transfer of data to/from peripheral devices 230, 240, 250. Shown within the connector 210 are two ports 212, 214 and an adapter 140. The adapter 140 is connected through each port 212, 214 to an independent physical path 222, 232, respectively, each of which provides a separate path to peripheral devices 230, 240, and 250. More ports may be used to connect more or fewer devices; the number and kinds of peripheral devices being only representative of the multiple physical paths which may be provided by commonly available multi-ported peripheral devices. The number of redundant paths to a given peripheral devices is not fixed and may vary from zero, i.e., one path having no redundancy, to N paths with N-1 redundancy. Each physical path 222, 232 may be a bus but need not be configured to be the same as any other independent physical path to the same device, e.g., physical path 222 may be a SCSI bus and physical path 232 may be a fiber channel or Infiniband bus. The redundancy manager, moreover, may be equipped to route commands on a wireless independent path. Within the adapter 140 is device control logic 224, 234 to control and reset each device 230, 240, 250.

Figure 3:
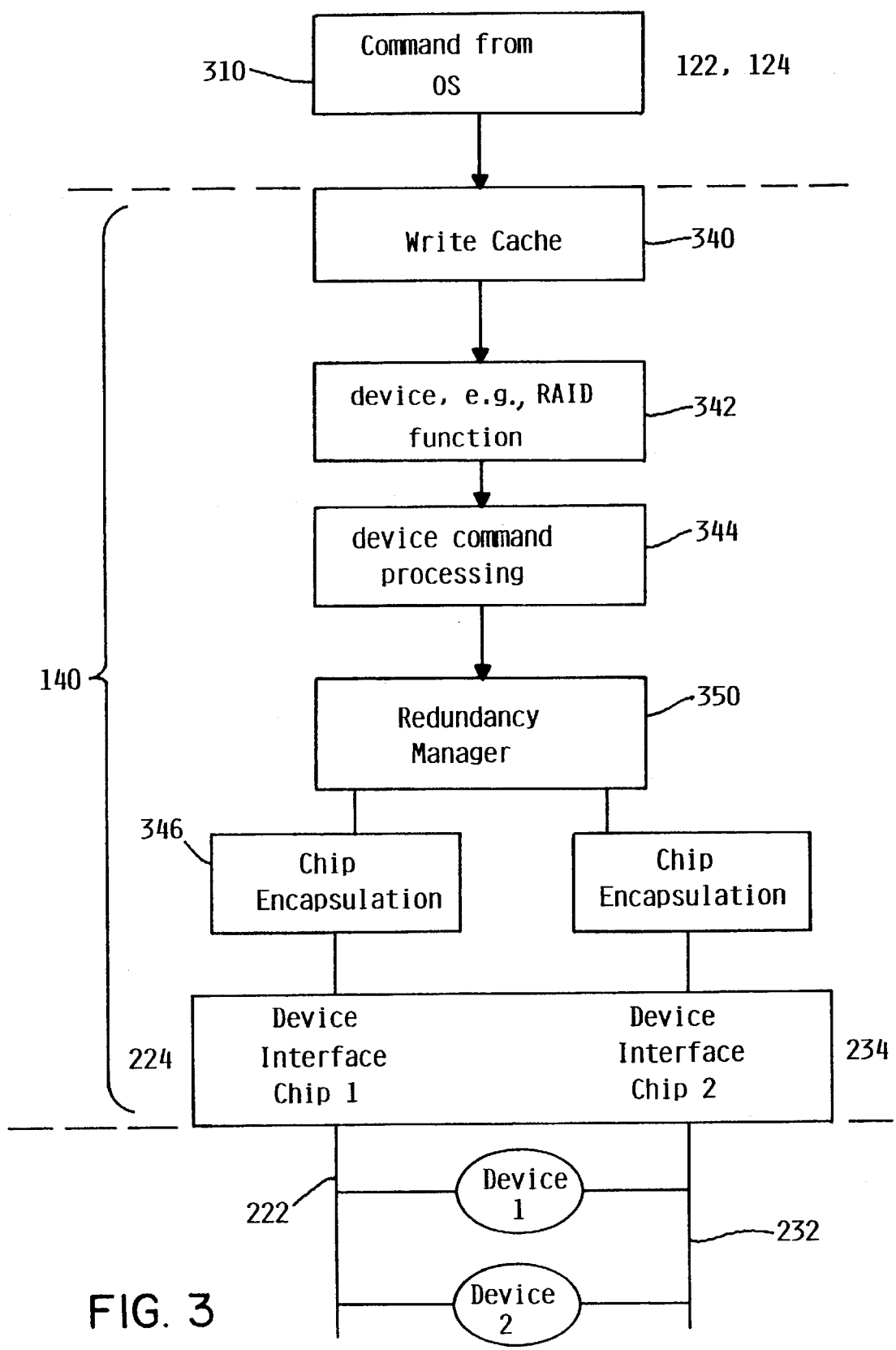
FIG. 3 is a simplified chart illustrating the logic of command processing in an adapter having a redundancy manager in accordance with an embodiment of the invention.

With reference to FIG. 3, there is shown a simplified logic chart of the functions and the device mechanisms preferably embodied in the adapter 140 which are used in accordance with principles of the invention. In block 310, the host processor complex 102 issues a command from the operating system 122, 124 along the host system bus 115 to an adapter 140, preferably an I/O adapter. Typical I/O commands that are issued from the host operating system 122, 124 include READ/WRITE, FORMAT, REASSIGN, READ CAPACITY, etc. The adapter 140 preferably includes a redundancy manager 350 which manifests many of the features of the invention as described herein. The redundancy manager 350 herein could also be implemented by control circuitry through the use of logic gate, programmable logic devices, or other hardware components in the adapter in lieu of microcode. Within the adapter 140, microcode or firmware may perform advance function processing as provided, e.g., write caching 340, RAID or other device scheduling 342, and device command processing 344 to, inter alia, build a command in the device language.

Features of the invention will now be described with respect to the processes of the adapter. The command issued by the host operating system and/or applications 122, 124 may be stored in the adapter's write cache 340, if available. A new command is selected from the write cache 340 according to a command issuance scheme. If there is specialized function processing such as compression, read caching, RAID scheduling, mirroring, etc., those processes occur under the auspices of the device function microcode 342. The device command processing section 344 of the adapter 140 then logically translates the new command into the device language and builds a command the device can interpret. From the device command processing 344, the command issues to the redundancy manager 350, which in accordance with principles of the invention, dynamically determines which physical path will be used for transmission of each command. Once the redundancy manager 350 chooses the physical path, the command is forwarded to a layer of code called the chip encapsulation 346 which sets registers and hardware of the device interface chips 224, 234 for the adapter to actually talk across the physical path to the device itself. From the device interface chips 224, 234, the command is received in the device and the device executes the command. The device then sends a response indicating if the command was successfully executed or if an error or other conditions attach to the response. The response returns to the chip encapsulation code 346 which in turn notifies the redundancy manager 350 and forwards the command response to the device command processing 344. If any error recovery occurs because the command was unable to execute, error recovery may take place in the device command processing 344. The device command processing 344 forwards the response to the host operating system 122, 124.

The redundancy manager 350 manages all the physical paths to a device to which it is attached so that the host operating system and driver software 122, 124, any write cache 340, any device function 342 and/or any device command processing 344 is unaffected by either the redundancy manager 350 or the number of redundant paths that actually exist. The management and use of all the pathways to a particular device by the redundancy manager 350, moreover, is transparent to these components, i.e., the interface presented to the host driver software, the write cache 340, and the device function 342 and command processing 344 when using redundant paths is the identical interface used when no redundancy is supported. The host driver software issues the same commands and uses the same error recovery procedures which eliminates the need for changes in the host driver software if there are redundant paths. These and other functions are performed by the redundancy manager 350 in accordance with the preferred embodiments of the invention as described herein.

In one aspect of the invention, the redundancy manager 350 discovers and resolves all the devices on all physical paths to which it is connected. Although there may be N physical paths to a particular device, the redundancy manager 350 ultimately presents one logical path to the operating system 122 and the device and command functions above the redundancy manager 350 by correlating information from the N paths and resolving existing aliases. The redundancy manager 350 interrogates each physical path and determines the number of active/inactive devices on each path by reading the world wide identification code and/or the vital product data. Using the identification code and/or the vital product data, the redundancy manager 350 then resolves aliases, correlates the separate physical paths to/from each device into one logical path, and presents the device to the operating system. Further, the redundancy manager 350 conforms commands on each physical path to the ordering semantics and other requirements of the operating system and maps the command to the physical capabilities of the protocol of the physical path used, for example, the redundancy manager 350 would implement the queue tags of the SCSI architectural model (SAM) protocol.

Figure 4:
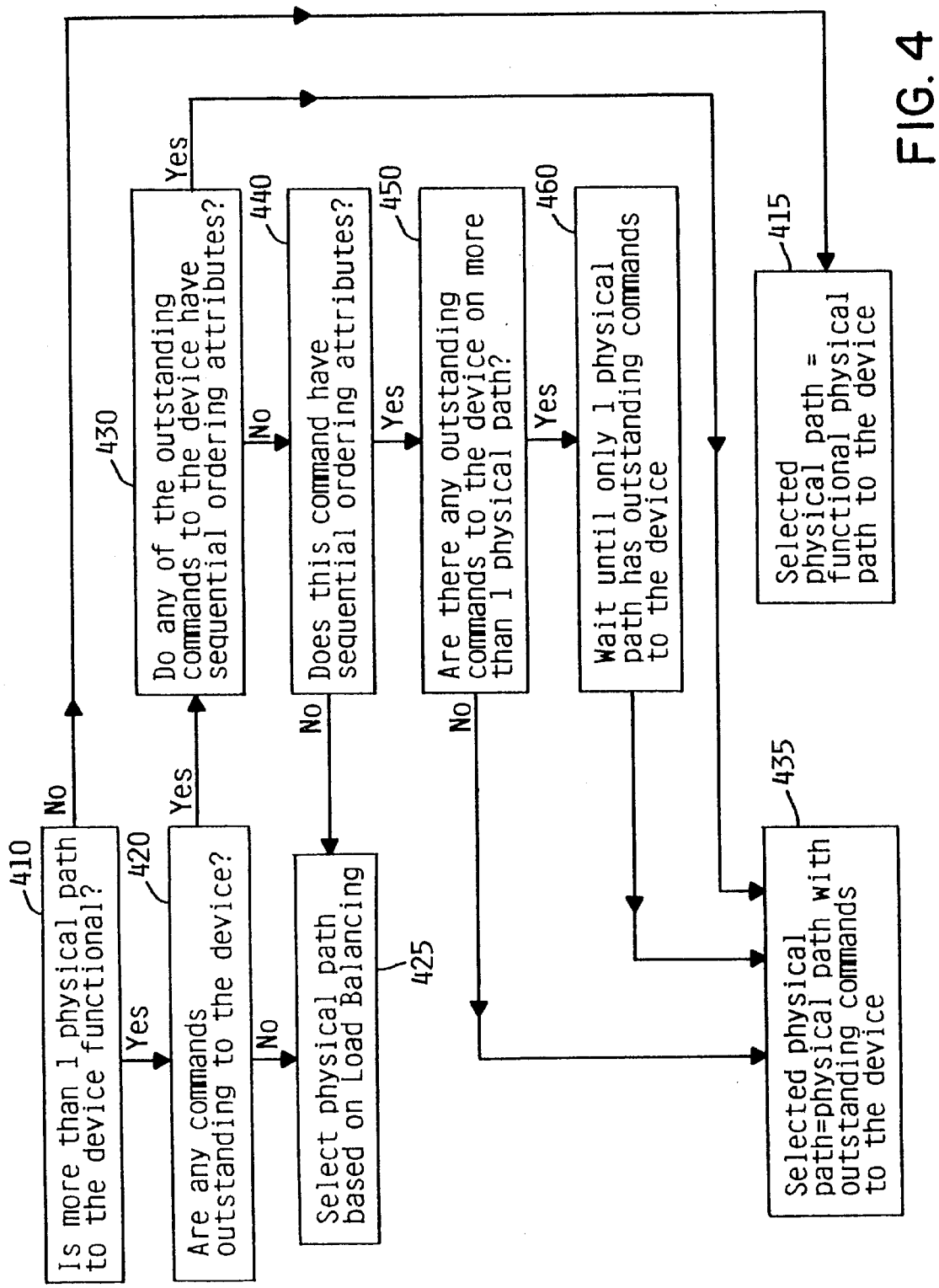
FIG. 4 is a simplified flow chart of a method to select a physical path to a device for execution of a command in accordance with an embodiment of the invention. It is suggested that FIG. 4 be printed on the face of the patent.

FIG. 4 provides a simplified flow chart of a process by which the redundancy manager may select a physical path given a particular device which is to perform a command routed into the adapter. While it is presumed that the command originates from the host operating system, in more complex and sophisticated computer systems a command may originate from another peripheral device, a computer system other than the host computer system, and/or from advanced adapter processing within the adapter itself. In any event, after a new command to execute arrives in the redundancy manager, in step 410, the redundancy manager 350 determines if there is more than one functional physical path to the device corresponding to the incoming command. Of course, if there is only one functional physical path to the device the redundancy manager selects that sole functional physical path, as in block 415, upon which to transfer the command. If, however, there are redundant physical paths to the device that are also functional, the redundancy manager then determines if there are any outstanding commands to the device, as in block 420. If there are no outstanding commands, the redundancy manager in block 425 selects the physical path according to a priority scheme or a load balancing algorithm to balance the number and priority of commands given redundant paths and multiple commands. One such load balancing algorithm is presented below. If, however, there are outstanding commands to the device the redundancy manager checks in block 430 if any of the outstanding commands have any special ordering attributes such that the outstanding commands must be executed sequentially or in some other order. For instance, as briefly discussed earlier, a WRITE command of updated data to a particular memory location must execute before a READ command to the same memory location to ensure that the correct data is read. If commands that have arrived before the new command must be executed sequentially or in accordance with some other priority or criteria the redundancy manager selects the physical path with the outstanding commands, as in block 435. On the other hand, if none of the outstanding commands have special ordering requirements, then as in block 440, the redundancy manager looks at the new command to determine if the new command has special execution parameters, such as sequential ordering requirements or some other priority. If not, then as in block 425 the redundancy manager selects the physical path using a load balancing algorithm, one of which is described below.

If the new command does have special execution parameters, the redundancy manager in block 450 establishes if there are any outstanding commands to the device on any physical path. The redundancy manager preserves but does not interfere with the ordering semantics of a particular protocol associated with the physical path. Given the decision that ordering semantics or some other priority scheme must be preserved, the redundancy manager logically degrades the redundant physical paths to one path and the protocol of that physical path then enforces the ordering semantics or priority scheme. In this fashion, if there are outstanding commands on more than one physical path, then the outstanding commands must execute first and the redundancy manager waits in block 460 until only one physical path has outstanding commands before selecting the physical path with outstanding commands to the device, as in block 435. If, however, there is only one physical path that has outstanding commands to the device, then the redundancy manager selects that path having the outstanding commands, as in block 435.

As discussed above and in accordance with another aspect of the invention, the redundancy manager may dynamically balance the command load on the several pathways to a particular device. Dynamic load balancing between multiple physical paths is done by the redundancy manager without host operating system or device drive software intervention to make the most efficient use of the available bandwidth. The redundancy manager 350 may concurrently route commands to the same device down redundant paths of which a consequence is that a system with N redundant physical paths has up to N times the bandwidth available than a non-redundant system. One technique which may be used by the redundancy manager calculates the most efficient physical path each time a new command comes into the adapter. This calculation may be the summation of the product of a number of load balancing factors times the weight given each factor. One such factor includes the number of outstanding or pending commands that have not yet been executed on a physical path to a particular device. Some physical paths, moreover, have more than one device so the number of devices on the particular physical path may also be considered. If a particular path has a large number of commands waiting for execution on one or more attached devices, it is more likely that the particular physical path may not be selected for the next command and that physical path would not be weighted heavily. Another factor is the amount of data waiting to be transferred on a physical path. An additional consideration is whether the pending data transfer is to/from one or to/from multiple devices and the amount of data to be transferred with the command. Certainly, it follows that a particular physical path to multiple devices having large pending data transfers may not be selected. Another load balancing factor which is dynamically considered is the expected latency of the outstanding commands to not only a specific device but to all the devices on a particular physical path. Thus, the redundancy manager may consider these and other factors on a per command basis to dynamically balance the loads by considering the number of devices, the amount of data, the number of commands, and the anticipated latency of the commands An example of a load balancing algorithm may be represented by the following equation which is recalculated for each new command to be executed. In this embodiment, the physical path having the smallest Load Balancing Factor (LBF) is selected.

LBF(command)=(Cppd*CppdW)+(Cppad*CppadW)+(Dppd*DppdW)+(Dppad*DppadW)+(Lcppd*LcppdW)+(Lcppad*LcppadW)+(Lppd*LppdW).

Where Cppd is the number of commands outstanding on a physical path to the device, and CppdW is the weight given the Cppd factor:

Cppad is the number of commands outstanding on a physical path to all devices, and CppadW is the weight given the Cppad factor;

Dppd is the amount of data transfer outstanding on a physical path to the device, and DppdW is the weight given the Dppd factor;

Lcppd is the expected latency of outstanding commands on a physical path to the device, and LcppdW is the weight given the Lcppd factor;

Lcppad is the expected latency of outstanding commands on a physical path to all devices, and LcppadW is the weight given the Lcppad factor;

Lppd is the latency of a physical path to a device; and

LppdW is the weight given the Lppd factor.

One of skill in the art will realize that for certain applications, fewer or more or different factors will be considered in load balancing, perhaps using other algorithms.

In a preferred embodiment, the redundancy manager also has the capability to detect a failed physical path and dynamically reroute a command to a device on a path other than the failed path, called failover. The detection, failover, and recovery from a failed physical path is automatic and happens without host operating system or driver software intervention. With the redundancy manager, moreover, a failed physical path does not result in lost access to a resource, it only reduces the total available bandwidth until the failed physical path is repaired. The redundancy manager will not use the failed physical path until it is repaired. Any operations that were in process using the failed physical path are handled such that the device command processing of the adapter uses the identical error recovery procedures as it did in the non-redundant case. The redundancy manager ensures that the peripheral devices are in the state expected by the device command processing, e.g., an ACA state used by the SAM protocol by, for instance, issuing commands to the peripheral device using a functional physical path to get the peripheral device into the expected state. Recovery of a failed physical path, moreover, occurs automatically and is transparent to the host driver software.

Figure 5:
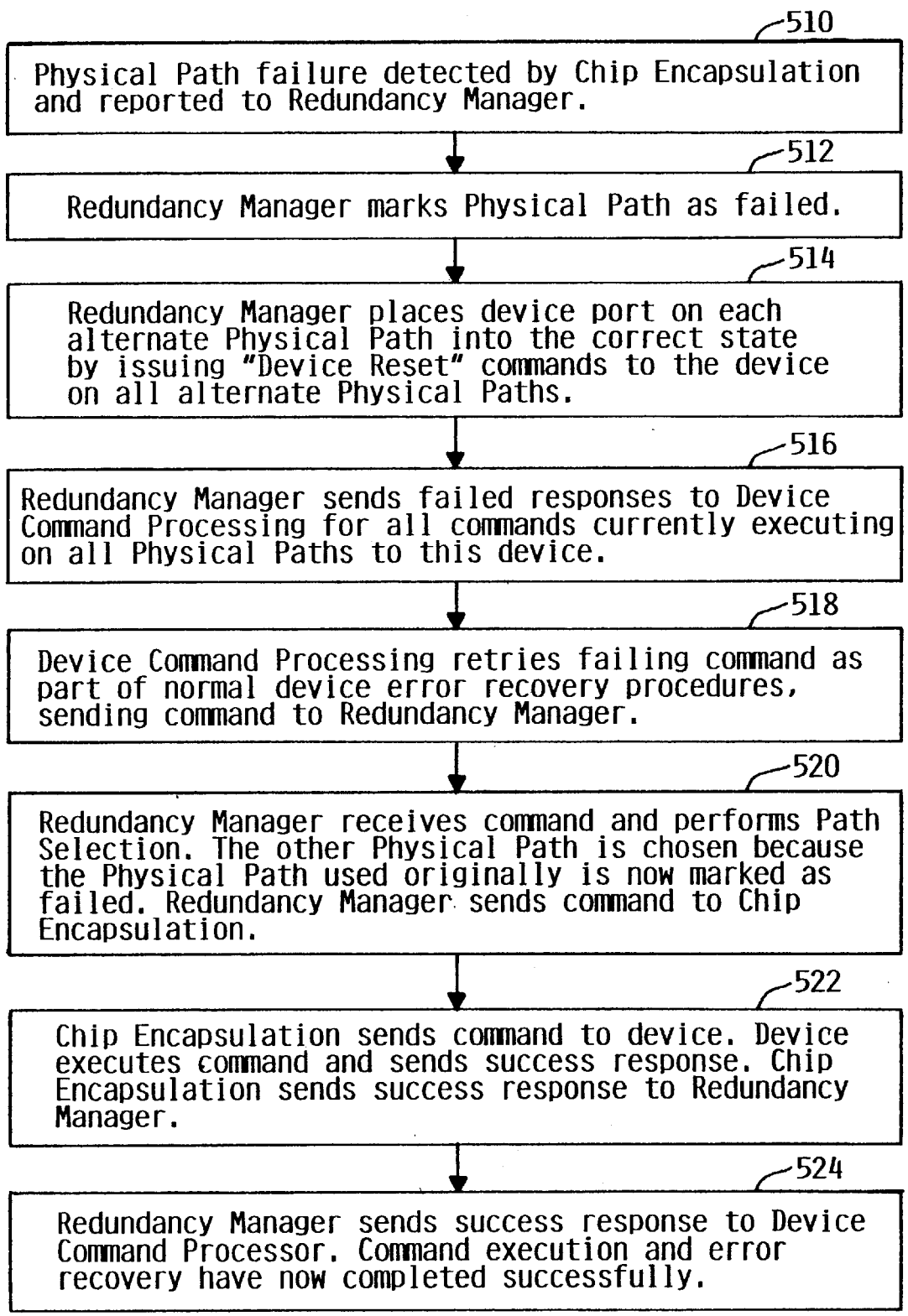
FIG. 5 is a simplified flow chart of a method to reroute commands from a failed path to an alternate path in accordance with an aspect of the invention.

With reference to FIG. 5, there is a simplified flow chart of the process by which the redundancy manager accomplishes failover. In FIG. 5, failure of a physical path to a device is detected by the chip encapsulation (346 of FIG. 3) and reported to the redundancy manager, as in block 510. In step 512, the redundancy manager marks the physical path as failed. In step 514, the redundancy manager issues a "device reset" command on each alternate physical path to place its respective port of the device into a correct state. There may have been commands currently executing in the device during failure of the physical path, and so in step 516, the redundancy manager routes those responses to the device command processing (344 in FIG. 3). As part of normal error recovery procedures, the device command processing retries the command that was pending when the physical path failed by sending it to the redundancy manager. In step 520, the redundancy manager receives the command and performs the path selection as in FIG. 4. Because the original physical path which failed has been marked, an alternate physical path is chosen. The redundancy manager sends the command to chip encapsulation. Chip encapsulation sends the command to the device which executes the command and sends a "successfully completed" response, as in step 522. In step 524, the redundancy manager sends the response to the device command processor. Thus, with little or no delay and without intervention of the host operating system or the device driver software, the command has been rerouted and was able to successfully complete. Recovery of a previously failed path happens automatically and is transparent to the host driver software. If the redundancy manager detects that a path that previously failed is now functional, then it immediately begins using it again without requiring host intervention. This implies that the failed physical path may be repaired concurrent with normal operation. A system outage is not needed to perform maintenance, re-enable usage of the failed physical path, and regain redundancy.

Examples of currently existing technologies to which the invention can be applied are host driver software, the SAM, and multi-ported fiber channel peripheral devices. The key advantage is that the invention allows the use of multiple paths with no change in the host driver software talking to the peripheral devices using the SAM model. The invention provides a redundant physical path to a peripheral device, not a redundant copy of the data found on the device. The redundant data technologies typically used with disk devices such as RAID-1 (mirroring), RAID-3, or RAID-5 may be used in conjunction with the invention.

While the invention has been described in connection with what is presently considered the most practical and preferred embodiments, it is to be understood that the invention is not limited to the disclosed embodiments, but on the contrary, is intended to cover various modifications and equivalent arrangements included within the spirit and scope of the appended claims.

What is claimed is:

1. In a computer system, a method of managing command and data flow to peripheral devices, comprising the steps of:

(a) determining the number of a plurality of independent physical paths to at least one peripheral device connected to the computer system;

(b) resolving all of the plurality of independent physical paths to the at least one peripheral device into one logical path;

(c) presenting the one logical path to any components of the computer system that originates or preprocesses a command destined for the at least one peripheral device;

(d) receiving the command destined for the at least one peripheral device from the originating and/or preprocessing components; and (e) for each received command, selecting one of the plurality of independent physical paths on which to route the received command to the at least one peripheral device.

2. The method of claim 1 wherein said step of determining the number of a plurality of independent physical paths to the at least one peripheral device connected to the computer system further comprises reading all the identification codes uniquely associated with at least one peripheral device on the plurality of independent physical paths.

3. The method of claim 2 wherein said unique identification code associated with at least one peripheral device is a world wide identification code and/or vital product data.

4. The method of claim 2 wherein said step of resolving all of the plurality of independent physical paths to the at least one peripheral device into one logical path further comprises determining if there is a duplicative identification code on any of the plurality of independent physical paths thereby indicating that the at least one peripheral device has a plurality of independent physical paths connected to it, and if so, correlating the connected plurality of independent physical paths.

5. The method of claim 1, further comprising:
   (a) preserving protocol requirements of the selected physical path.

6. The method of claim 1, wherein said step of selecting one of the plurality of independent physical paths on which to route the command to the at least one peripheral device further comprises determining the number of functional physical paths to the at least one peripheral device.

7. The method of claim 6, further comprising:
   (a) determining the number of outstanding commands to the at least one peripheral device; and
   (b) determining if any outstanding command and/or the received command has any required execution attributes.

8. The method of claim 7, further comprising honoring any required execution attributes of the received command and/or of any outstanding commands destined for the at least one peripheral device.

9. The method of claim 8, wherein the step of honoring any required execution attributes of the received command and/or of any outstanding commands intended for the at least one peripheral device further comprises:
   (a) if there are outstanding commands, determining if any outstanding command have any required execution attributes; determining if the received command has any required execution attribute; determining if there are any outstanding commands to the at least one peripheral device on more than one independent physical path;
   (b) if so, waiting until only one independent physical path has any outstanding commands for the peripheral device and selecting the physical path with the outstanding commands for the received command.

10. The method of claim 6 further comprising reallocating a received command load to the peripheral device on the independent paths.

11. The method of claim 10, wherein said step of balancing a command load to the peripheral device on the independent paths further comprises:
   (a) for each independent physical path, summing the product of a plurality of load balancing factors and the weight given each factor; and
   (b) selecting the independent physical path having the lowest sum.

12. The method of claim 11, wherein one of the plurality of load balancing factors comprises the number of outstanding commands to the at least one peripheral device.

13. The method of claim 11, wherein one of the plurality of load balancing factors comprises the number of outstanding commands on a physical path to all devices.

14. The method of claim 11, wherein one of the plurality of load balancing factors comprises the amount of data associated with an outstanding command on a physical path to the at least one peripheral device.

15. The method of claim 11, wherein one of the plurality of load balancing factors comprises the expected latency of outstanding commands on a physical path to the at least one device.

16. The method of claim 11, wherein one of the plurality of load balancing factors comprises the expected latency of outstanding commands on a physical path to all devices.

17. The method of claim 11, wherein one of the plurality of load balancing factors comprises the latency of a physical path to the at least one device.

18. The method of claim 1, wherein said step of determining the number of a plurality of independent physical paths to the at least one peripheral device further comprises:
   (a) detecting that at least one of the plurality of independent physical paths to the at least one peripheral device has failed;
   (b) rerouting the received command to a functional physical path;
   (c) ensuring the at least one peripheral device is in a state ready to accept the rerouted command.

19. The method of claim 18, further comprising repairing the failed physical path concurrently with rerouting the received command.

20. The method of claim 18, further comprising using the failed path after its repair.

21. A computer system for transferring commands to a peripheral device, comprising:
   (a) a central processing unit to execute an operating system and at least one device driver application program applicable to at least one peripheral device;
   (b) a main memory connected to the central processing unit with a memory bus;
   (c) at least one peripheral device attached to the central processing unit and the main memory;
   (d) a plurality of independent physical paths connecting the central processing unit and main memory with the at least one peripheral device;
   (e) a redundancy manager connected between the at least one peripheral device and the host system bus to dynamically manage each command to the at least one peripheral device without intervention of the operating system and/or the at least one device driver application program.

22. The computer system of claim 21, wherein the plurality of independent pathways do not have the same protocol.

23. The computer system of claim 21, wherein the redundancy manager comprises an input/output adapter.

24. The computer system of claim 21, wherein the redundancy manager manages commands on the plurality of independent physical paths independent of command processing and independent of the protocols of the independent physical paths.

25. The computer system of claim 24, wherein the redundancy manager further comprises a path determiner which dynamically chooses for each command the independent path for the command to the at least one peripheral device.

26. The computer system of claim 24, wherein the redundancy manager further comprises a path resolver that resolves all the independent physical paths to the at least one peripheral device into one logical path presented to the operating system, the device driver application program, the command processing.

27. The computer system of claim 24, wherein the redundancy manager further comprises a load balancer that balances the command load across the independent physical paths.

28. The computer system of claim 24, wherein the redundancy manager further comprises a ordering maintainer which preserves ordering semantics of the protocols of the independent physical paths.

29. The computer system of claim 24, wherein the redundancy manager further comprises a rerouter which reroutes commands/data from a failed independent physical path to a functional independent physical path connected to the peripheral device.

30. The computer system of claim 29, wherein the redundancy manager further comprises a path repair detector that detects when the failed independent physical is once again functional and begins to manage commands on the recovered path.

31. An I/O adapter connected between a central processing unit having an operating system and a plurality of device driver applications and a plurality of external peripheral devices of which at least one of the external peripheral devices has a multiported connection to independent physical paths connected to the I/O adapter, the I/O adapter having a redundancy manager comprising:

(a) means to detect the number of independent physical paths to the at least one external peripheral device;

(b) means to resolve more than one independent physical path to the same at least one external peripheral device into one logical pathway;

(c) means to present the one logical pathway to the central processing unit and to any command/data processing prior to the redundancy manager;

(d) means to receive a command/data intended for the at least one peripheral device;

(e) means to dynamically determine the optimum independent physical path for the received command/data to the at least one peripheral device;

(f) means to preserve the protocols and ordering semantics of the independent physical paths to the at least one peripheral device;

(g) means to detect if an independent physical path has failed;

(h) means to reroute a command from the failed independent physical path;

(i) means to detect that the failed independent physical path has recovered; and (j) means to automatically use the recovered independent physical path.

32. A program product for use in a computer network for managing multiple independent physical pathways connected to a peripheral device, said computer program product comprising a signal-bearing medium carrying thereon a redundancy manager comprising:

(a) a detector of all multiple independent paths connected to the peripheral device;

(b) a resolver to project to the computer network one logical pathway to the peripheral device;

(c) a path calculator which determines an optimum pathway of the multiple independent physical paths for transit of incoming commands/data to the peripheral device;

(d) a deferral agent to defer ordering semantics of the incoming and any outstanding commands/data intended for the peripheral device to a protocol of the multiple independent paths; and (e) a selector operable for each incoming command/data to determine an appropriate path considering the results of the path calculator and the deferral agent.

33. The program product of claim 32, wherein the detector notifies the selector that one or more of the multiple independent paths have failed and the selector reroutes the incoming command/data to another of the multiple independent paths.

34. The program product of claim 33, further comprising a state resetter to reset all the multiple independent paths other than the failed path(s)into a state to accept the incoming command/data.

35. The program product of claim 34, further comprising a recovery notifier to begin using the failed one of the multiple independent paths when the failure has been corrected.

* * * * *